July 15, 1941.          S. G. JOHNSON          2,249,611
INTERNAL THREAD GAUGE
Filed Feb. 8, 1939
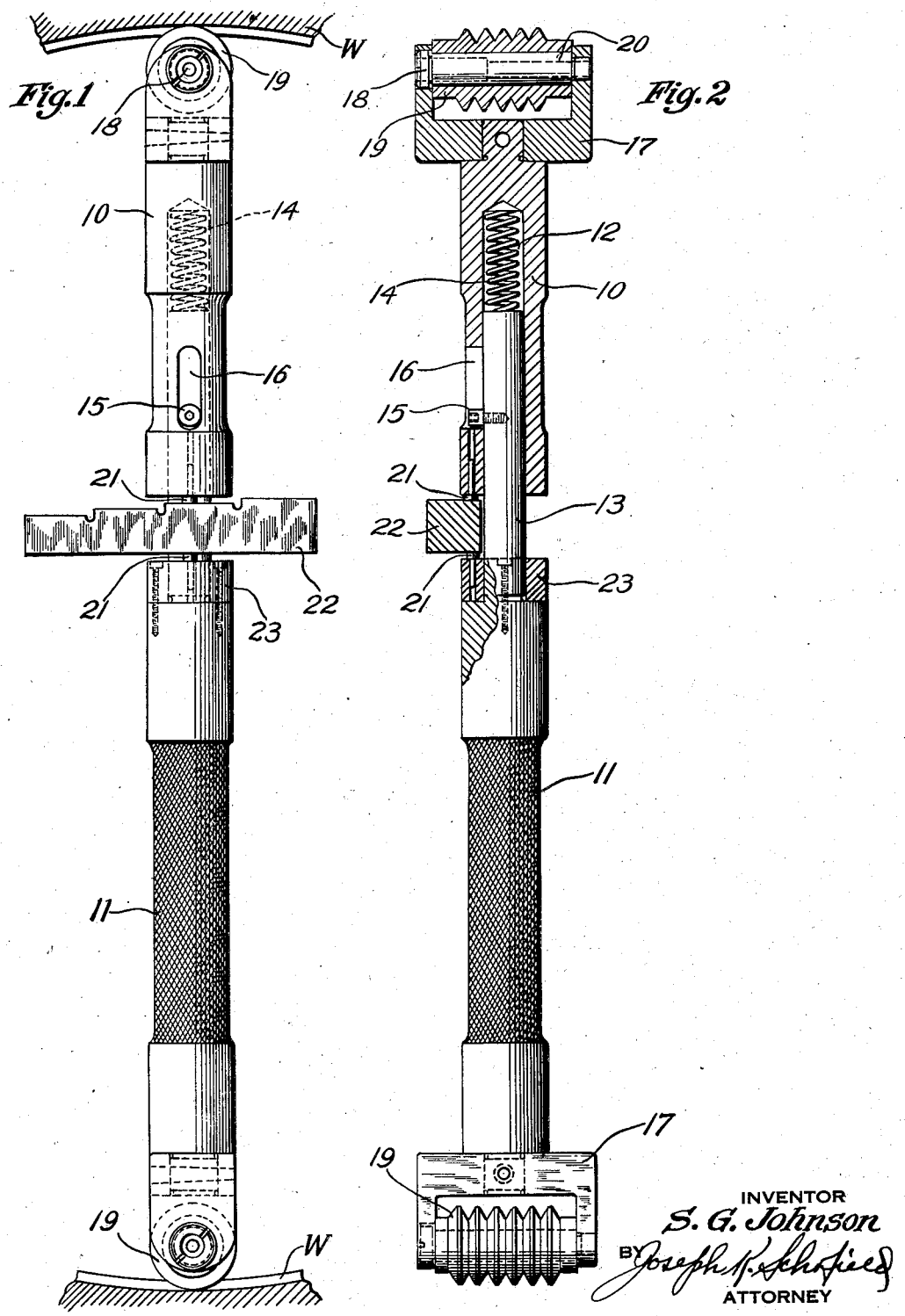
INVENTOR
S. G. Johnson
BY
Joseph K. Schofield
ATTORNEY Patented July 15, 1941

2,249,611

UNITED STATES PATENT OFFICE 2,249,611

INTERNAL THREAD GAUGE

Stanley G. Johnson, Hartford, Conn., assignor to Niles-Bement-Pond Company, Hartford, Conn., a corporation of New Jersey Application February 8, 1939, Serial No. 255,281

4 Claims. (Cl. 33—199)

This invention relates to internal thread gauges and particularly to a gauge of this type that is inexpensive to make and which may be used to quickly indicate variations in dimensions of internal screw threads from a given standard to a high degree of precision.

An object of the present invention is to provide a telescoping rod adapted to fit within a member which has internal screw threads being gauged, there being thread engaging members at opposite ends of the rod normally forced into engaging contact with the threads being gauged.

A feature of importance of the invention is that the thread engaging members are freely rotatable and having cylindrical surfaces grooved to correspond to the pitch of the screw threads being gauged so that they may properly intermesh therewith.

Another object of importance is to provide opposed abutments formed or mounted upon intermediate portions of the rod which are spaced apart when the thread contacting members are in engagement with the screw threads being gauged, thus enabling a measuring block to be inserted between the abutments to determine variations in distance between the ends of the gauge and variations in sizes of the pieces being gauged.

Another feature of importance is that a spring housed within one member and engaging the end of a projection on the other member of the rod normally forces the two parts of the telescoping rod to their maximum distance apart, there being a limiting member which prevents complete separation of the two members.

With the above and other objects in view, the invention may include the features of construction and operation set forth in the following specification and illustrated in the accompanying drawing.

In the accompanying drawing annexed hereto and forming a part of this specification, I have shown the invention embodied in a gauge for screw threads of large diameter, but it will be understood that the invention can be otherwise embodied and that the drawing is not to be construed as defining or limiting the scope of the invention, the claims appended to this specification being relied upon for that purpose.

In the drawing:

Figure 1 is a longitudinal outside view of a complete gauge shown in engaging position and with a gauge block inserted between abutments thereon, and Fig. 2 is a longitudinal view, partly in section, and at a right angle of the gauge shown in Fig. 1.

In the above mentioned drawing there has been shown but one embodiment of the invention which is now deemed preferable, but it is to be understood that changes and modifications may be made within the scope of the appended claims without departing from the spirit of the invention.

Briefly and in its broadest aspect, the invention may comprise: First, a rod made up of two interfitting and telescoping members, one of which has a projection entering an axial recess in the other member; second, a spring inserted within the recess and adapted to bear against the end of the projection; third, means to prevent separation of and maintain the two members forming the gauging rod in alinement, this member comprising a small stud threaded into the projection and extending through a slot in the recessed member; and fourth, opposed abutments on adjacent portions of the two members.

The gauge illustrated in the drawing includes two principal members 10 and 11 each of which mounts a gauging member presently to be more fully described. Each of these members is in the form of an elongated rod. Member 10 has an axial recess 12 formed therein and extending a substantial distance of its length. Member 11 is provided with an axially extending projection 13 adapted to fit slidably within recess 12. Between the end of projection 13 and of recess 12 is disposed a spring 14 normally forcing the members 10 and 11 apart. A small stud 15 secured in fixed position within and outstanding from the projection 13 enters and slides within a recess 16 provided therefor in the member 10. By means of this stud 15 and the recess 16 the members 10 and 11 are prevented from becoming separated and are also maintained accurately in alinement.

On the outer end of each member 10 and 11 forming the rod is a yoke member 17 preferably pinned or otherwise permanently secured to the end thereof. Within each yoke 17 is supported a transversely extending sleeve 20 surrounding a pin or screw 18. On the sleeves 20 the gauging members 19, adapted to fit the screw threads W being gauged, are rotatably mounted. These gauging members 19, as shown, are of cylindrical form having spaced annular grooves therein corresponding to the pitch and form of the screw threads W being gauged. In order to vary the dimensions or adjust the size of the gauge of the type shown in the drawing, the gauging members 19 are mounted on portions of the sleeves 20 eccentric relative to their supporting surfaces in the yoke member 17. By rotating a sleeve 20 and securing it in adjusted rotative position by means of a screw 18 or other means the gauging member 19 may be moved slightly axially of the rod 10.

On adjacent portions of the members 10 and 11 forming the telescoping rod are small abutments 21 carefully surfaced upon their outer ends so that they are precisely parallel to each other. Between the surfaces of these abutments 21 when the gauge is in position as indicated in Fig. 1 a gauging block 22 having opposite parallel faces may be inserted. This gauging block 22 may have a plurality of surfaces along portions of one edge or side at slightly different distances from the opposite side or edge. The gauge block 22 therefore may be placed between the abutments 21 and the particular surface of the gauging block that will pass between the abutments will indicate the distance apart of the gauging members 19.

It will be understood that the recessed members 10 for gauges of all dimensions may be identical and that the members 11 having the projections fitting within the recess may have their intermediate portions of widely varying lengths. Furthermore, annular members 23 of varying height may be fitted upon this member 11 over the projection 13 so that the abutment 21 preferably secured in this member 23 may be at substantially the same distance from the opposed abutment 21 for a large number of dimensions of gauges. This member 23, as shown, may be secured in position as by means of one or more screws or other fastening devices. When assembled the rotatable gauging members 19 will have their axes exactly parallel to each other and the distance between them will be chosen to enable the gauge to be used for a particular size of screw threads being gauged. The members 10 and 11, when the gauge is being used, are first forced together and the gauge inserted within the threaded member W being gauged. The members 10 and 11 are then separated by the spring 12, thus forcing the gauging members 19 into work engaging positions. A gauge block 22 is then inserted between the abutments 21 and the dimension of the block 22 at the portion closely fitting between the abutments is observed. From this dimension and by comparing the dimensions obtained when the gauge is inserted within a master gauge the correctness of the screw threads gauged may be determined.

What I claim is:

1. A gauge for internal screw threads comprising in combination, a two-part telescoping rod having a thread engaging member at the outer end of each part, spring means normally forcing said parts to engage said members with the threads being measured, and an abutment on each of said parts of said rod spaced apart when said parts are in gauging position, whereby the adjustment of said members when in engaging positions may be determined.

2. A gauge for internal screw threads comprising in combination, a two-part telescoping rod having a thread engaging member at the outer end of each part, spring means normally forcing said parts to engage said members with the threads being measured, an abutment on each of said parts of said rod spaced apart when said parts are in gauging position, and means contacting said abutments to determine variations in the distance between said abutments when said parts are in their engaging positions.

3. A gauge for internal screw threads comprising in combination, a two-part telescoping rod having rotatable cylindrical thread engaging members circumferentially grooved to intermesh with the screw threads being gauged at the outer end of each part, means normally forcing said parts to engage said members with the threads being measured, and an abutment on each of said parts of said rod spaced apart when said parts are in gauging position, whereby the adjustment of said members when in engaging positions may be determined.

4. A gauge for internal screw threads comprising in combination, a two-part telescoping rod having a thread engaging member at the outer end of each part, spring means normally forcing said parts to engage said members with the threads being measured, an abutment on each of said parts of said rod spaced apart when said parts are in gauging position, and a member having a plurality of parallel surfaces predetermined distances apart contacting said abutments to determine variations in the distance between said abutments when said parts are in their engaging positions.

STANLEY G. JOHNSON.